United States Patent Office 3,792,024
Patented Feb. 12, 1974

3,792,024
POLYMERIZATION OF BENZIMIDAZOBENZO-
PHENANTHROLINE-LADDER POLYMER
Lowell Saferstein, Plainfield, N.J., assignor to Celanese
Corporation, New York, N.Y.
No Drawing. Filed July 27, 1972, Ser. No. 275,596
Int. Cl. C08g 20/32
U.S. Cl. 260—78 TF       14 Claims

ABSTRACT OF THE DISCLOSURE

An improved method of forming a benzimidazobenzo-phenanthroline-ladder polymer is disclosed. An organic tetraamine (e.g., 1,2,4,5-tetraaminobenzene) and a tetracarboxylic acid dianhydride (e.g., 1,4,5,8-naphthalene dianhydride) are reacted in a polyphosphoric acid solvent in the presence of a catalytically effective amount of a metal cation-containing Lewis Acid (e.g., antimony trichloride) to form the polymer.

BACKGROUND OF THE INVENTION

Benzimidazobenzophenanthroline-ladder polymers (hereinafter called "BBL polymers") are known, thermally stable organic polymers. These polymers, for example, do not undergo decomposition until temperatures greater than 500° C. However, BBL polymers are difficult to manufacture and are particularly difficult to manufacture in a purity and with an inherent viscosity sufficient to allow the polymers to be subsequently formed into fibers or filaments or the like.

The BBL polymers have been formed by the reaction of a tetracarboxylic acid such as 1,4,5,8-naphthalenetetra-carboxylic acid (NTCA) with an organic tetraamine such as 1,2,4,5 - tetraaminobenzenetetrahydrochloride (TAB) in polyphosphoric acid. This reaction is shown, for example, in Polymer Letters, vol. 4, pages 211 to 214 (1966) and Journal of Polymer Science, Part A–1, vol. 6, pages 1777, 1793 (1968). However, BBL polymers made in this fashion are not particularly satisfactory since NTCA is available in a relatively impure form. The resulting polymers are thus relatively impure, extremely difficult to purify and low in inherent viscosity. Also NTCA is relatively unstable and may not be stored or kept for any lengthy period of time without decomposition or ring closure to the anhydride. The prior art process is particularly unsuitable for production of any major amounts of the BBL polymer.

BBL polymer is similar to but more stable than the known bis-benzimidazobenzophenanthroline (hereinafter "BBB polymer") polymer. BBB polymer may be made, for example, by reacting NTCA with diaminobenzidine (DAB).

It has recently been found and is disclosed in copending application Ser. No. 229,178, filed Feb. 24, 1972, that BBB polymers may be advantageously formed by reacting NTCA and DAB in a molten Lewis Acid solvent (e.g., heavy metal halide). The Lewis Acid may be a single Lewis acid or a mixture, most advantageously a eutectic mixture, as disclosed in copending application Ser. No. 221,780, filed Jan. 28, 1972, of Lewis acids. This improved BBB polymer process has been found, however, to be totally unsuitable for the formation of BBL polymers.

The search has therefore continued for a relatively simple method for the production of high-purity BBL polymers suitable for forming into shaped articles such as fibers, filaments, films or the like.

It is an object of this invention to provide a relatively simple process for the production of BBL polymers.

It is also an object of this invention to provide an improved process for the production of BBL polymers in a relatively pure form.

It is further an object of this invention to provide a process for the production of BBL polymers utilizing high purity, stable starting materials.

SUMMARY OF THE INVENTION

These and other objects of the invention are achieved by an improvement in a process for forming a benzimidazobenzophenanthroline-ladder polymer by reacting a tetracarboxylic acid dianhydride and an organic tetraamine in a polyphosphoric acid solvent which improvement comprises conducting said reaction in the presence of a catalytically effective amount of a metal cation-containing Lewis acid.

DETAILED DESCRIPTION OF THE INVENTION

It has surprisingly been found that the utilization of a metal cation-containing Lewis acid as a catalyst in the process of this invention gives high yields of BBL polymer having a high purity and the inherent viscosity suitable for formation into fibers, filaments, films or the like. In addition, the inherent viscosity of the resulting polymer is relatively constant in each of the runs made.

Lewis acids, i.e., substances containing an element which is two electrons short of having a complete valance shell, are electron pair acceptors and thus coordinate strongly with atoms such as nitrogen, oxygen or the $\pi$ electrons of the aromatic ring. This coordination is extremely strong between atoms such as nitrogen, oxygen and sulfur with the metallic ions such as tin, zinc or antimony of the heavy metal, transition element halides.

The preferred metal cation-containing Lewis acids of the instant invention are the heavy metal, transition element halides. The more preferred metal cation-containing Lewis acids are those halide salts wherein the heavy metal transition element has a plus two or plus three valance state. Chlorine and bromide are the preferred halides and the preferred metal cation-containing Lewis acid catalysts of the present invention are selected from the group consisting of antimony trichloride, bismuth trichloride, aluminum trichloride, stannous chloride, gallium chloride, germanium bromide, germanium chloride, zinc bromide, and zinc chloride.

The BBL polymers are prepared by reacting at least one organic tetraamine with at least one tetracarboxylic acid dianhydride in a polyphosphoric acid and in the presence of a catalytically effective amount of a Lewis acid catalyst.

The organic tetraamines which may be used in the process of the present invention are those which may be depicted by the following general structural formula:

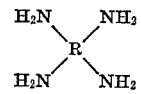

wherein R is a monocyclic aromatic or cycloaliphatic tetravalent hydrocarbon radical and wherein each amino group is attached directly to a carbon atom present in a ring of said aromatic or cycloaliphatic radical in a position in which it is ortho to one other amino group, meta to one other amino group and para to one other amino group. In addition, R may be a multicyclic aromatic tetravalent hydrocarbon radical such as a naphthalene, pyrene, perylene or chrysene radical so long as a fully ladder polymer results.

Non-limiting examples of the organic tetraamines useful in the process of the present invention include:

1,2,4,5-tetraaminobenzene
1,4,5,8-tetraaminonaphthalene
2,3,6,7-tetraaminonaphthalene
2,3,6,7-tetraaminoanthracene
1,2,6,7-tetraaminophenanthrene The preferred organic tetraamine is 1,2,4,5-tetraaminobenzene.

The organic tetraamine is conveniently used in the form of the tetrahydrochloride salt, e.g., 1,2,4,5-tetraaminobenzene tetrahydrochloride, because of the availability and stability of the salt. Hydrogen chloride gas will be evolved during the reaction as the tetraamine is liberated and dissolved in the polyphosphoric acid, and the reaction is generally conducted to remove the evolved hydrogen chloride gas without excessive foaming of the reaction mixture.

Illustrative of the tetracarboxylic acid dianhydrides which may be used to prepare the BBL polymers in the process of the present invention, are those which may be depicted by the following general structural formula:

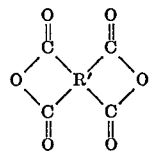

wherein R' is a tetravalent aromatic or cycloaliphatic radical and wherein each of the carboxyl groups is attached directly to a carbon atom present in a ring of said aromatic or cycloaliphatic radical in a position which is ortho or peri to another carbon atom to which another of the said carboxyl groups is also directly attached. When R' is a carboxyl substituted bicyclic fused ring compound, such as a tetracarboxyl substituted naphthalene the carbon atoms at the 1 and 8 position are considered to be peri to one another as are the carbon atoms in the 4 and 6 positions. Five or six member rings are formed depending upon whether R' is ortho or peri carboxyl substituted respectively. This will be apparent to those skilled in the art. It is preferred that R' be an aromatic radical rather than a cycloaliphatic radical and also that R' preferably contain up to about 20 carbon atoms.

Non-limiting examples of the tetracarboxylic acid dianhydrides useful in the process of the present invention include the dianhydrides of the following acids:

pyromellitic acid
2,3,6,7-naphthalene tetracarboxylic acid
3,3',4,4'-diphenyl tetracarboxylic acid
1,2,5,6-naphthalene tetracarboxylic acid
2,2',3,3'-diphenyl tetracarboxylic acid
2,2-bis(3,4-dicarboxyphenyl)propane
bis(3,4-dicarboxyphenyl)sulfone
3,4,9,10-perylene tetracarboxylic acid
bis(3,4-dicarboxyphenyl)ether
ethylene tetracarboxylic acid
naphthalene-1,2,4,5-tetracarboxylic acid
naphthalene-1,4,5,8-tetracarboxylic acid
decahydronaphthalene-1,4,5,8-tetracarboxylic acid
4,8-dimethyl-1,2,3,5,6,7-hexahydronaphthalene-1,2,5,6-tetracarboxylic acid
2,6-dichloronaphthalene-1,4,5,8-tetracarboxylic acid
2,3,6,7-tetrachloronaphthalene-1,4,5,8-tetracarboxylic acid
phenanthrene-1,8,9,10-tetracarboxylic acid
cyclopentane-1,2,3,4-tetracarboxylic acid
pyrrolidine-2,3,4,5-tetracarboxylic acid
pyrazine-2,3,5,6-tetracarboxylic acid
2,2-bis(2,3-dicarboxyphenyl)propane
1,1-bis(2,3-dicarboxyphenyl)ethane
1,1-bis(3,4-dicarboxyphenyl)ethane
bis(2,3-dicarboxyphenyl)methane
bis(3,4-dicarboxyphenyl)methane
bis(3,4-dicarboxyphenyl)sulfone
benzene-1,2,3,4-tetracarboxylic acid
1,2,3,4-butane tetracarboxylic acid
thiophene-2,3,4,5-tetracarboxylic acid
3,4,3',4'-benzophenone tetracarboxylic acid
2,3,2',3'-benzophenone tetracarboxylic acid
2,3,3',4'-benzophenone tetracarboxylic acid The tetracarboxylic acid dianhydrides are stable monomers while the corresponding tetracarboxylic acids often are not. In addition, less water is liberated during the condensation reaction when the dianhydride is used which allows the polymer to more easily stay in solution and thus build up to a higher molecular weight.

The reaction of the present invention can conveniently be illustrated by the following diagrammatical representation for the reaction of 1,4,5,8-naphthalene dianhydride and 1,2,4,5-tetraaminobenzene.

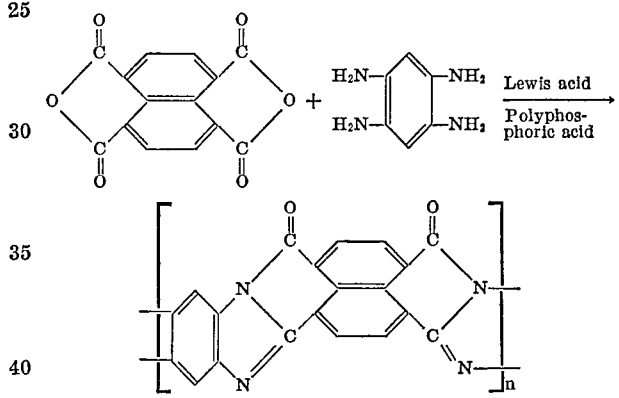

The polyphosphoric acid polymerization medium utilized in the presence process may be of varied concentration. For example, it may contain an $H_3PO_4$ concentration of about 100 to 117 percent by weight, or about 75 to 85 percent by weight expressed as $P_2O_5$, and more preferably an $H_3PO_4$ concentration of about 100 to 109 percent by weight, or about 75 to 79 percent by weight expressed as $P_2O_5$. The acid concentration expressed as $H_3PO_4$ may be determined by mixing the phosphoric acid with water and titrating with a standard base after warming to allow depolymerization.

The polyphosphoric acid medium selected for use in the process may be a commercially available polyphosphoric acid. For instance, polyphosphoric acid is commercially available containing an $H_3PO_4$ concentration of about 115 percent by weight, and a $P_2O_5$ equivalent of about 82 to 84 percent by weight. Such a highly concentrated polyphosphoric acid prior to dilution is a solution of approximately 5 to 20 percent ortho- and pyrophosphoric acids mixed with various more highly polymerized polyphosphoric acids, mostly trimers, tetramers, pentamers, and hexamers. This acid may be used without modification or diluted with water to form a lesser concentrated polymerization medium. Upon dilution with water the higher acids present in the same tend to revert to orthophosphoric acid. Since the viscosity of a polyphosphoric acid increases approximately 50 fold over the $H_3PO_4$ concentration range of 105 to 117 percent by weight, phosphoric acids may be selected or formed for use in the present process exhibiting a substantially reduced viscosity which accordingly promotes easier handling and a more efficient admixture of reactants.

A particularly preferred concentration range of the phosphoric acid medium expressed as $H_3PO_4$ is about 105 percent by weight, i.e., superphosphoric acid which has a $P_2O_5$ equivalent of approximately 76 percent by weight. This phosphoric acid is available commercially under the designation "Phospholeum" from the Monsanto Company, and is a clear liquid at room temperature. The phosphoric acid having a concentration of 105 percent by weight expressed as $H_3PO_4$ is an azeotropic mixture of orthophosphoric and polyphosphoric acids.

The reaction may run at any suitable temperature such as, for example, a temperature of from about 150 to about 250, preferably from about 160 to about 190° C. and for a time effective to substantially complete the reaction, such as, for example, a time of from about 8 to about 30, preferably from about 16 to about 20 hours. The organic tetraamine and tetracarboxylic acid dianhydride starting reactants are present in substantially stoichiometric amounts. The metal cation-containing Lewis Acid catalyst may be present in a catalytically effective amount which generally can be from about 1 to about 30, often from about 5 to about 20 grams of the Lewis Acid per mole of either starting reactant. Conveniently, the reactants and catalyst are charged to a reactor and heated to about 100° C. for 12 hours while nitrogen or another inert gas is passed into the system to allow the hydrogen chloride gas evolved from the organic tetraamine hydrochloride to be slowly removed from the reaction mixture prior to polymerization. An inert gas atmosphere is utilized during the reaction to prevent oxidation of the tetraaminobenzene compound. If desired, the tetracarboxylic acid dianhydride may be added after the other reactants have been heated to remove hydrogen chloride gas.

The reaction mixture is thereafter raised to the polymerization temperature under the inert gas.

After polymerization, the very thick, cherry red colored solution (which contains about 1 to about 6, generally from about 2 to about 4 percent polymer) may be poured into methanol or water. The BBL polymer precipitates in long, fibrous strands. The polymer may be filtered, washed several times with water and dried.

The resulting BBL polymer has a greenish color. It is preferred that the molecular weight of the BBL polymer formed be such that its inherent viscosity is at least 0.3 (e.g., 0.5 to 5.0). The inherent viscosity is measured at 25° C. at a concentration of 0.4 g. of polymer per 100 ml. of solvent. Methanesulfonic acid is a convenient and preferred solvent for this determination though other solvents may be used similarly. The viscosity of the polymer solution is measured relative to that of the solvent alone and the inherent viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per 100 ml. of solution. As is known in the polymer art, inherent viscosity is monotonically related to the molecular weight of the polymer.

For comparative purposes, 1,2,4 - tetraaminobenzene tetrahydrochloride and 1,4,5,8-naphthalene dianhydride were dissolved in molten antimony trichloride at 180° C. for about 16 hours. No BBL polymer was obtained nor was any obtained when the reactants are dissolved in other Lewis Acids such as bismuth trichloride, aluminum trichloride, zinc chloride-stannous chloride and several others. Only a low I.V. black tar was obtained in all of these reactions. This same tar was obtained even when the free tetraamine was used in place of tetraamine salt. Although I do not wish to be bound by theoretical considerations, it would appear that a side reaction (known as the Scholl Reaction) takes place when these reactants are dissolved in the molten salt mixture and the tetraaminobenzene couples with itself to give octaaminobiphenyl which goes on to couple again and thus produce a black tar. The conditions of these totally unsuitable reactions were essentially the same as those used to produce the closely analogous BBB polymer from 1,4,5,8-naphthalene tetracarboxylic acid and diaminobenzidine.

The invention is additionally illustrated in connection with the following examples which are to be considered as illustrative of the present invention. It should be understood, however, that the invention is not limited to the specific details of the examples.

EXAMPLE I 1,2,4,5 - tetraaminobenzene tetrahydrochloride (1.42 parts by weight) is added to 82 parts by weight of polyphosphoric acid (115 percent by weight $H_3PO_4$, 84 percent by weight $P_2O_5$) and preheated to 100° C. for 12 hours while nitrogen is passed into the system. Hydrogen chloride slowly evolves during this time and the free tetraamine is liberated and dissolves in the polyphosphoric acid. After 12 hours, an approximately stoichiometric amount (1.34 parts by weight) of 1,4,5,8-naphthalene dianhydride is added along with 2 parts by weight of antimony trichloride per 0.1 mole of 1,2,4,5-tetraaminobenzene and the temperature of the entire mixture was raised to 190 C. over a 4 hour period and the resulting solution was held at 190° C. for 18 hours in the presence of nitrogen. The solution, which contains 2 percent BBL polymer, becomes very thick and cherry red during the polymerization period. The solution was stirred throughout the reaction.

The solution is poured into methanol and BBL polymer precipitates in long, fibrous strands. The polymer is filtered, washed several times with water and dried. The greenish colored BBL polymer appears very much like BBB polymer and has an I.V. of 3.0 dl./g. measured in methanesulfonic acid.

EXAMPLE II

The procedure of Example I is repeated except that the solution of polyphosphoric acid and tetraaminobenzene tetrahydrochloride was pre-heated at 100° C. for 4 hours. The resulting BBL polymers formed using the process of Example I have I.V.'s of between 1 and 2 dl./g.

EXAMPLE III

Example I is repeated except that the starting materials are reacted without a pre-heating period. Hydrogen chloride gas is evolved during the reaction. The resulting BBL polymer has an I.V. of about 1.

EXAMPLE IV

The procedures of Example I are repeated using zinc chloride, antimony dichloride, stannous chloride, aluminum chloride, bismuth trichloride and other Lewis Acids as catalysts, each in place of the antimony trichloride. The resulting BBL polymers are generally the same in appearance and I.V. as achieved with the procedure of Example I.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:
1. The process of forming a benzimidazobenzophenanthroline-ladder polymer comprising:
   reacting stoichiometric amounts of 1,4,5,8-naphthalene dianhydride and tetraaminobenzene tetrahydrochloride at a temperature of from about 150 to about 250° C. in a polyphosphoric acid solvent having a concen- tration of from about 100 to about 117 percent $H_3PO_4$ and in the presence of a catalytically effective amount of antimony trichloride.

2. A process for forming a benzimidazobenzophenanthroline-ladder polymer which comprises reacting substantially stoichiometric amounts of an organic tetraamine having the structural formula:

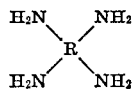

wherein R is an aromatic or cycloaliphatic tetravalent hydrocarbon radical and wherein each amino group is attached directly to a carbon atom present in a ring of said aromatic or cycloaliphatic radical in a position in which it is ortho to one other amino group, meta to one other amino group and para to one other amino group and a tetracarboxylic acid dianhydride having the structural formula:

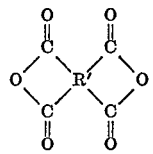

wherein R' is a tetravalent aromatic or cycloaliphatic radical and wherein each of the carboxyl groups is attached directly to a carbon atom present in a ring of said aromatic or cycloaliphatic radical in a position which is ortho or peri to another carbon atom to which another of the said carboxyl groups is also attached, at a temperature of about 150 to 250° C. in a polyphosphoric acid solvent having a concentration of about 100 to 117 percent by weight $H_3PO_4$ and in the presence of a catalytically effective amount of a metal cation-containing Lewis acid which is a chloride or bromide of a metal selected from the group consisting of antimony, bismuth, aluminum, tin, gallium, germanium or zinc.

3. The process of claim 2 wherein said organic tetraamine is 1,2,4,5-tetraminobenzene.

4. The process of claim 3 wherein said tetracarboxylic acid dianhydride is 1,4,5,8-naphthalene dianhydride.

5. The process of claim 2 wherein said metal cation-containing Lewis acid is antimony trichloride.

6. The process of claim 2 wherein said reaction is conducted at a temperature of from about 160 to about 190° C. and for a time of from about 8 to about 30 hours.

7. The process of claim 6 wherein said reaction mixture is post-heated at a temperature of from about 160 to about 190° C. for from about 16 to about 20 hours.

8. The process of claim 2 wherein said polyphosphoric acid solvent has a concentration of about 100 to 109 percent by weight $H_3PO_4$.

9. The process of claim 2 wherein said polyphosphoric acid solvent has a concentration of about 115 percent by weight $H_3PO_4$.

10. The process of claim 2 wherein said polyphosphoric acid solvent has a concentration of about 105 percent by weight $H_3PO_4$.

11. The process of claim 1 wherein said reaction is carried out at a temperature of about 160 to 190° C.

12. The process of claim 1 wherein said polyphosphoric acid solvent has a concentration of about 100 to 109 percent by weight $H_3PO_4$.

13. The process of claim 1 wherein said polyphosphoric acid solvent has a concentration of about 115 percent by weight $H_3PO_4$.

14. The process of claim 1 wherein said polyphosphoric acid solvent has a concentration of about 105 percent by weight $H_3PO_4$.

References Cited
UNITED STATES PATENTS

| 3,414,543 | 12/1968 | Paufler | 260—47 |
| 3,518,232 | 6/1970 | Bell, Jr. | 260—78 |
| 3,574,170 | 4/1971 | Chenevey | 260—78.4 |
| 3,574,171 | 4/1971 | Chenevey et al. | 260—78.4 |
| 3,575,941 | 4/1971 | Steinberg | 260—78.4 |

LESTER L. LEE, Primary Examiner

U.S. Cl. X.R.

260—47 CP, 65